United States Patent [19]

Morita

[11] Patent Number: 5,160,028
[45] Date of Patent: Nov. 3, 1992

[54] MAGNETIC TAPE CASSETTE ACCOMMODATING CASE

[75] Inventor: Kiyoo Morita, Kanagawa, Japan

[73] Assignee: Fuji Photo Film Co., Ltd., Kanagawa, Japan

[21] Appl. No.: 815,169

[22] Filed: Dec. 31, 1991

[30] Foreign Application Priority Data

Jan. 10, 1991 [JP] Japan ............................. 3-3351[U]
Jan. 24, 1991 [JP] Japan ............................. 3-13316[U]
Mar. 25, 1991 [JP] Japan ............................. 3-25184[U]

[51] Int. Cl.⁵ .......................................... B65D 85/575
[52] U.S. Cl. .................................. 206/387; 206/493
[58] Field of Search ................ 206/387, 493; 220/522

[56] References Cited

U.S. PATENT DOCUMENTS

| | | |
|---|---|---|
| D. 224,177 | 7/1972 | Wallace . |
| 3,747,745 | 7/1973 | Esashi et al. ................ 206/387 |
| 4,196,806 | 4/1980 | Posso ............................ 206/387 |
| 4,235,334 | 11/1980 | Ahn . |
| 4,253,567 | 3/1981 | Goldammer ................ 206/387 |
| 4,365,713 | 12/1982 | Ekuan .......................... 206/387 |
| 4,431,237 | 2/1984 | Saito et al. . |
| 4,627,534 | 12/1986 | Komiyama et al. ........ 206/387 |
| 4,648,507 | 3/1987 | Komiyama et al. . |

*Primary Examiner*—Jimmy G. Foster
*Attorney, Agent, or Firm*—Sughrue, Mion, Zinn, Macpeak & Seas

[57] ABSTRACT

A cassette accommodating case which can accommodate a plurality of cassettes but which has a generally thin structure and which can provide excellent storing convenience. The case includes a cover member having a pocket for receiving end portions of magnetic tape cassettes and a casing member having rotation stopper projections, with the cover member and the casing member being pivotably assembled. The pocket is formed so as to be large enough to receive the side end portions of the magnetic tape cassettes superposed in a reversed relation with respect to one another. A recess portion for receiving the thick portion of one of the superposed magnetic tape cassettes is formed on a wall surface of the cover member while a recess portion for receiving the thick portion of the other superposed magnetic tape cassette is formed on a wall surface of the casing member.

3 Claims, 13 Drawing Sheets

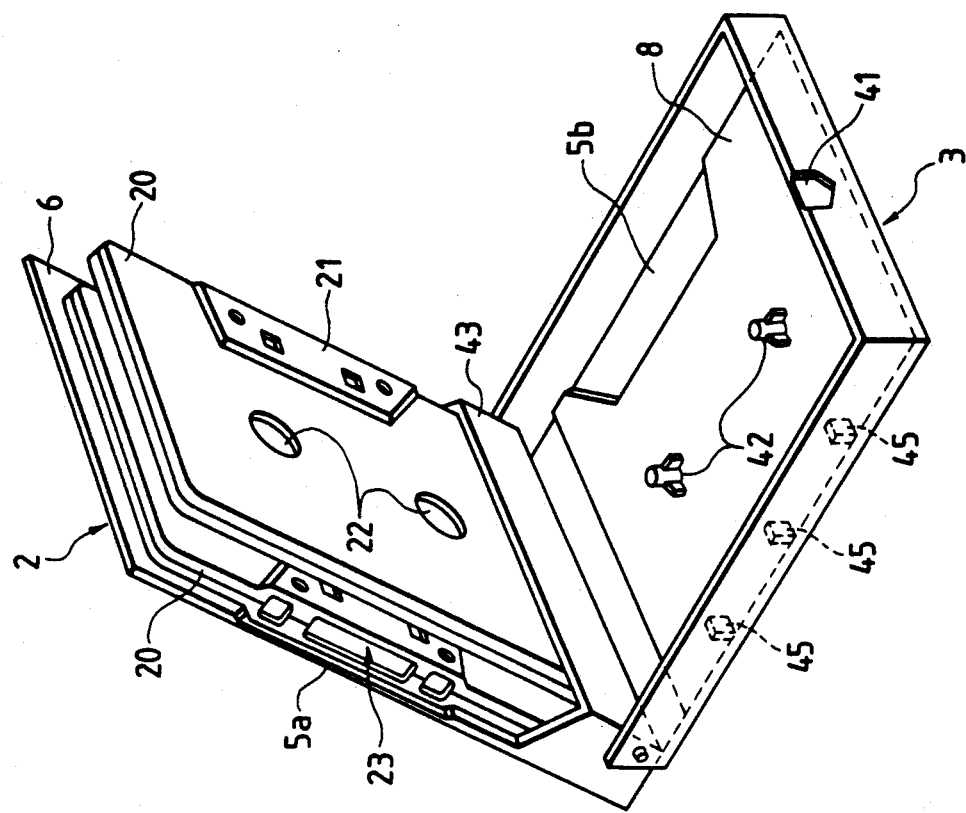
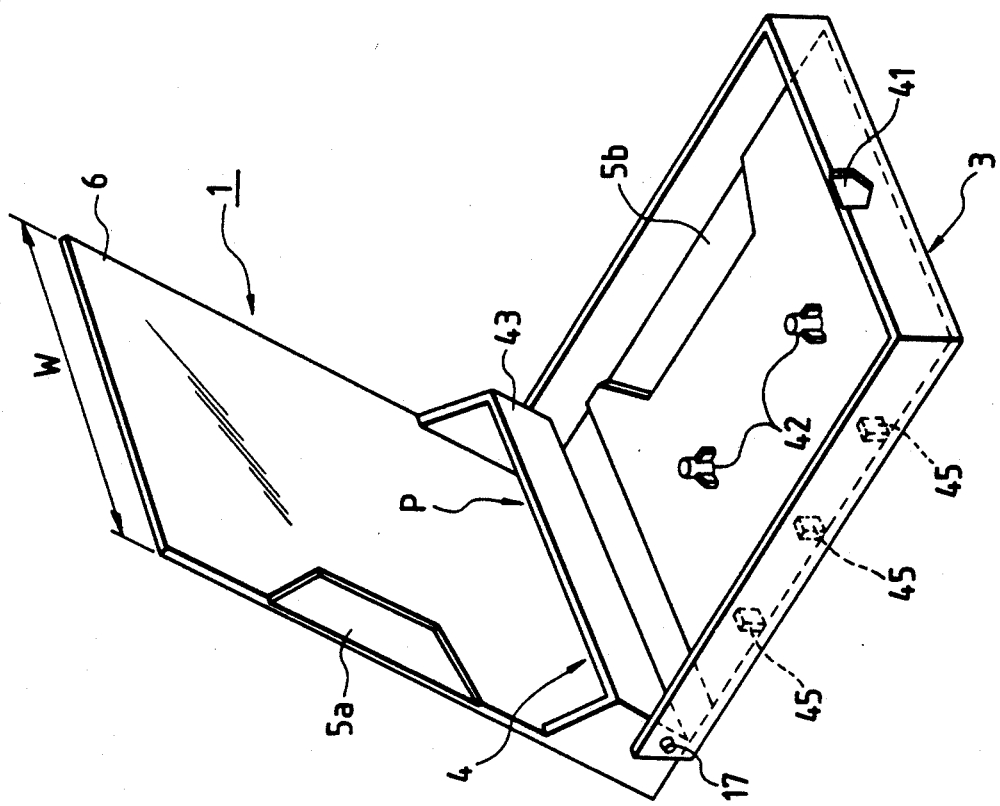

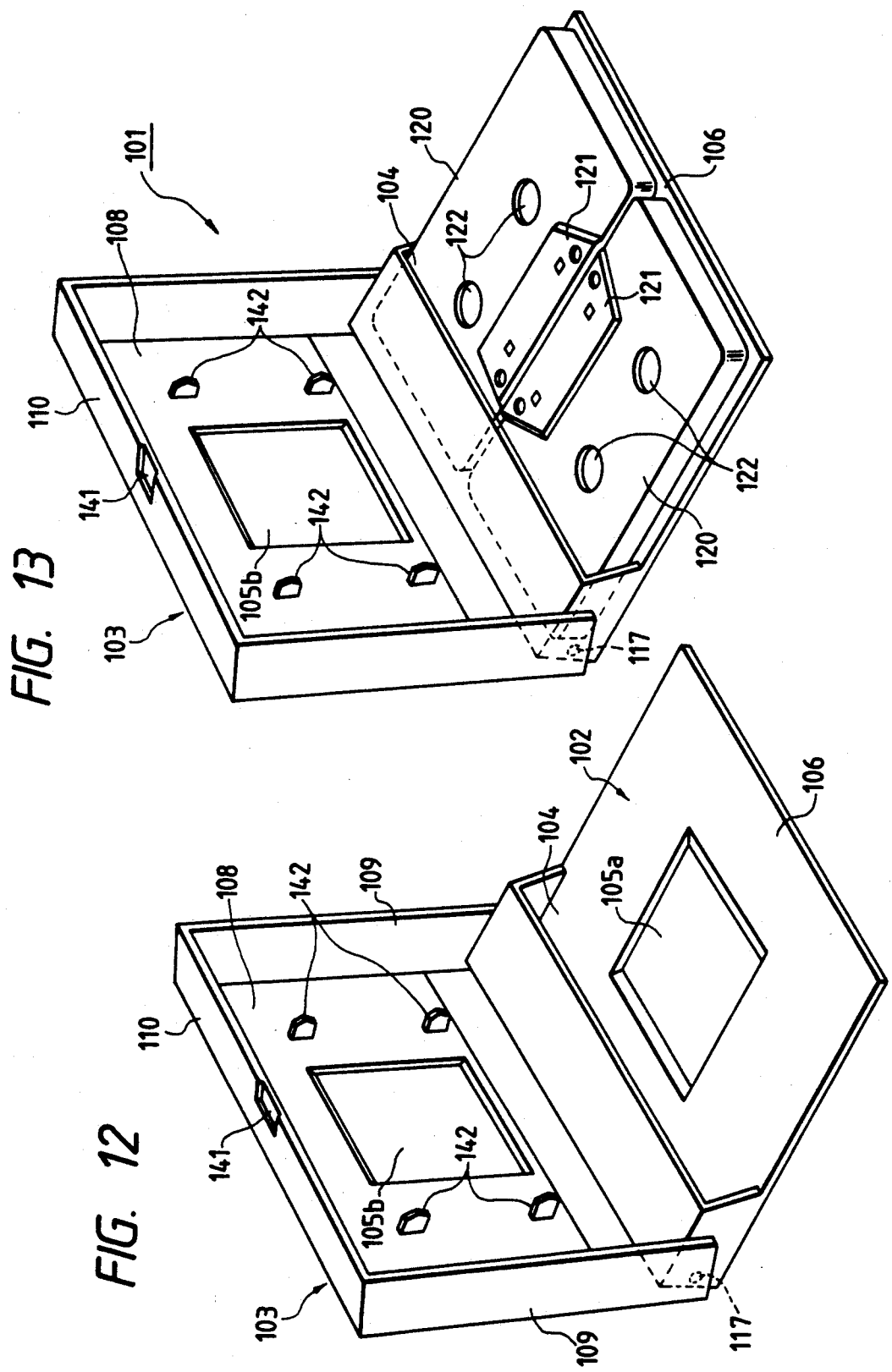

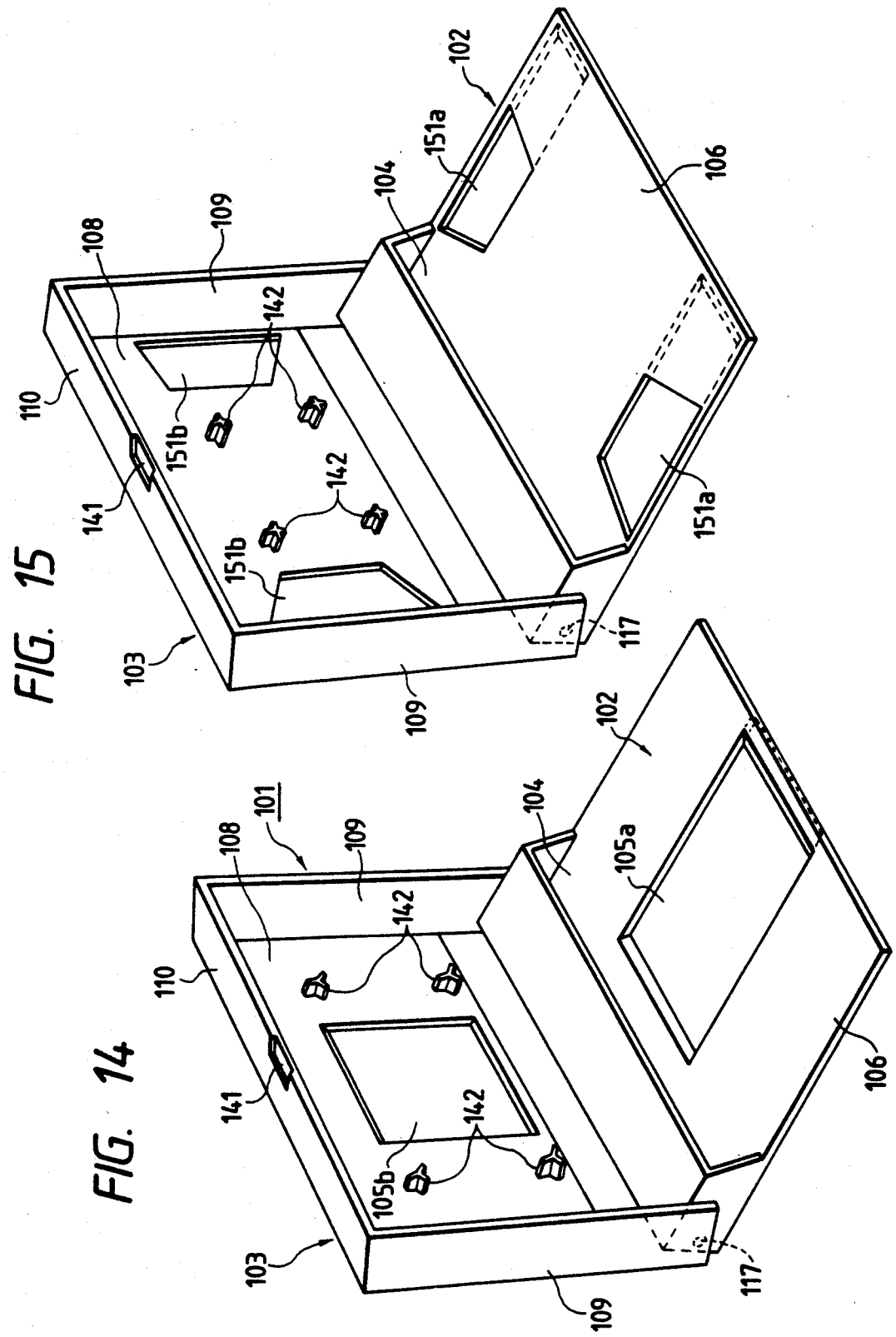

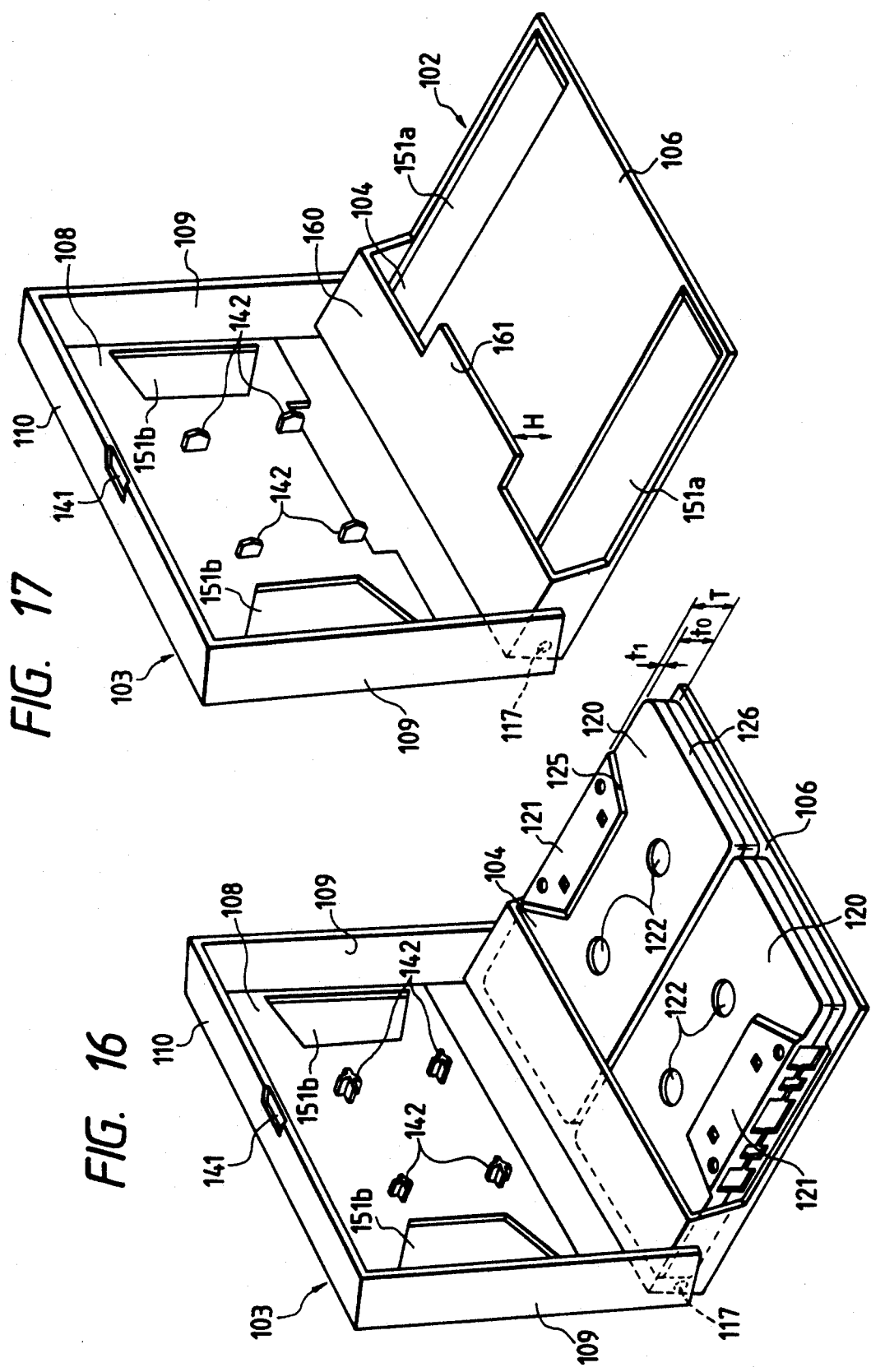

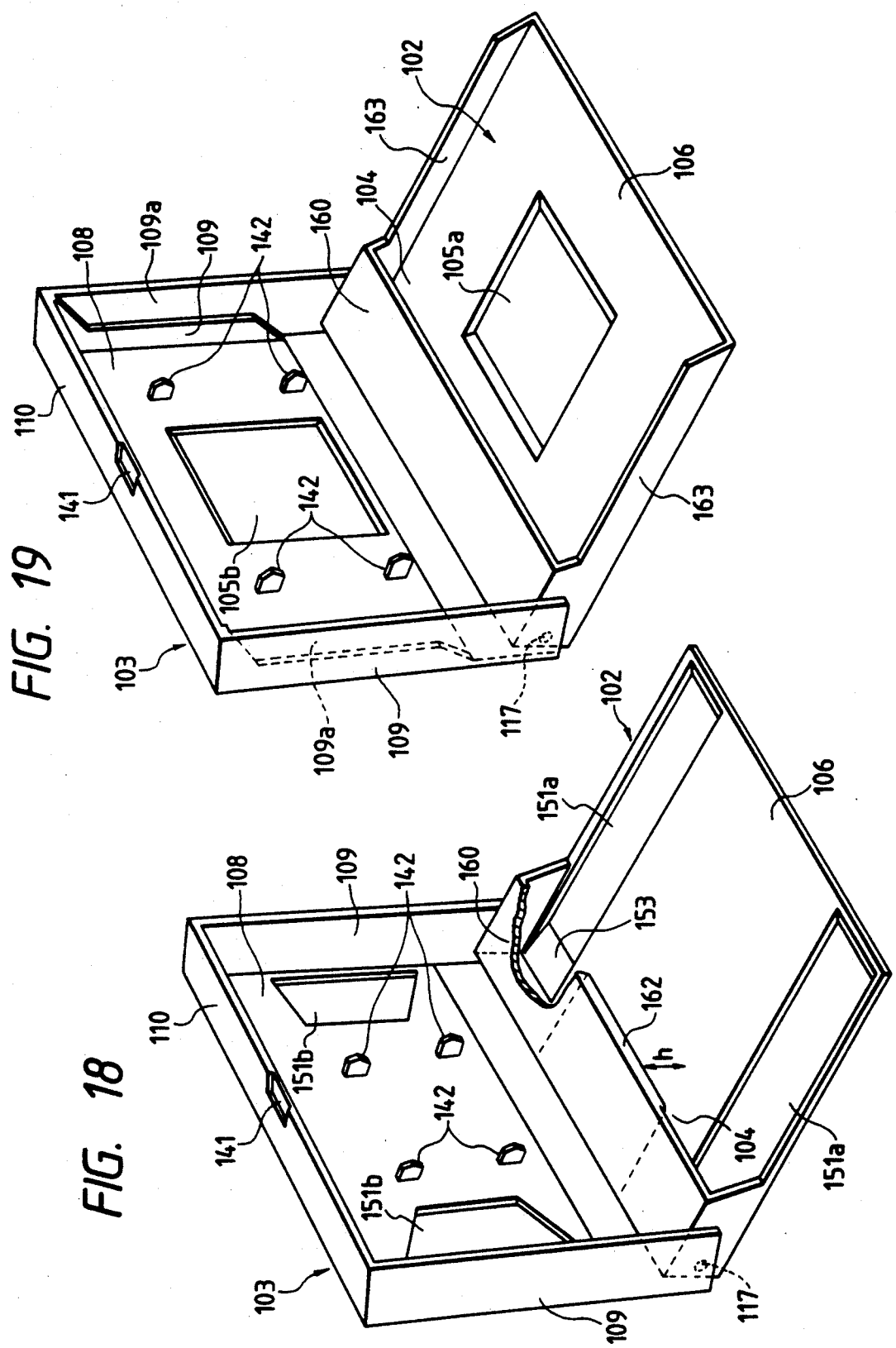

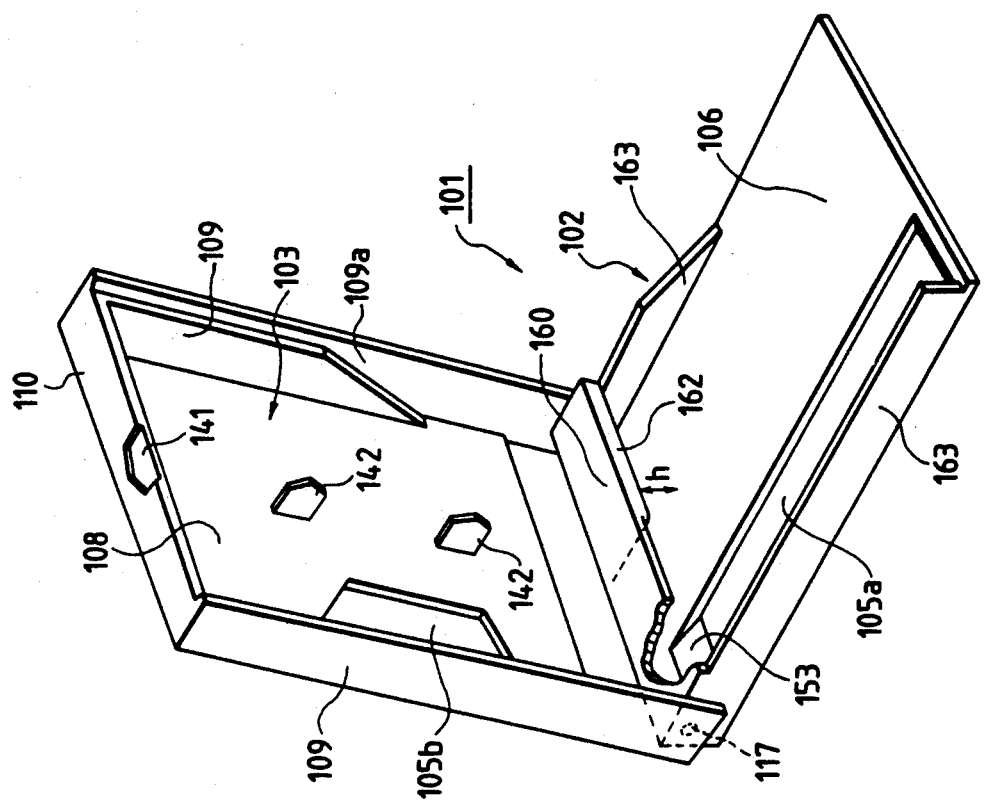
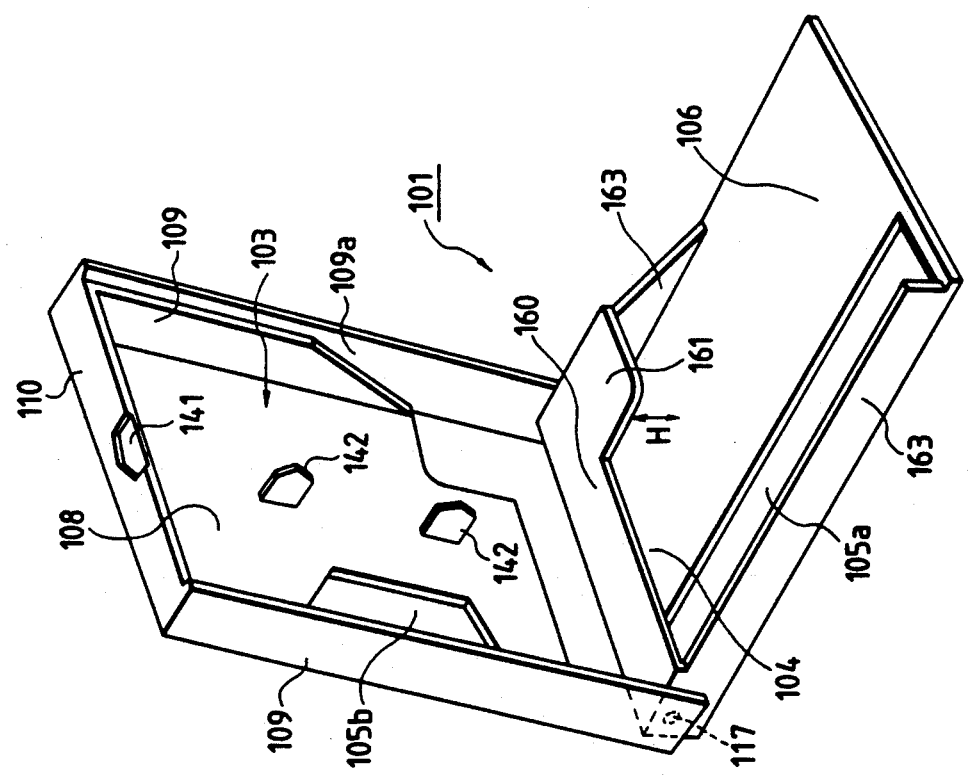

MAGNETIC TAPE CASSETTE ACCOMMODATING CASE

BACKGROUND OF THE INVENTION

The present invention relates to a magnetic tape cassette accommodating case, and more particularly to an improved case for accommodating audio magnetic tape cassettes for storage.

A magnetic tape cassette used for audio, etc., is usually accommodated in a dedicated case (hereinafter referred to as "cassette accommodating case") when it is stored.

Since a magnetic tape cassette has both a front opening end into which a magnetic head, etc., is inserted when the cassette is loaded into a recording/reproducing apparatus and a magnetic tape which traverses the front opening, the case not only prevents dust from entering the cassette from the front opening, but also protects both the magnetic tape as it traverses the front opening end and the cassette as a whole.

FIG. 1 shows the basic construction of a conventional cassette accommodating case. The case accommodating case 31 is composed of a cover member 32 having a pocket 34 and a casing member 35 having a pair of rotation stopper projections 7. The pocket 34 serves as a space into which the front opening end of stopper projections 7 are inserted into shaft insertion holes 22 of the cassette 20. The cassette accommodating case 31 is designed so that the casing member 35 and the cover member 32 can be opened and closed in the manner of a door by causing support projections to be fitted with throughholes, the support projections being internally arranged on lateral walls of the casing member 35 and the throughholes being provided on lateral walls of the pocket 34 close to its bottom.

The cassette accommodating case 31 is dimensionally designed so that its thickness between two wall portions 33, 36 respectively confronting the upper and lower surfaces of the cassette 20 corresponds to the thickness of a thick portion 21 forming the front opening end of the cassette 20. Thus, the cassette accommodating case 31 has a thickness $L_1$ that is quite large compared to the thickness $L_2$ of the thin portion of the cassette excluding its thick portion 21. Therefore, the cassette accommodating case 31 requires a storage space comparatively larger than would otherwise be required for accommodating just the thin portion of the cassette 20.

Thus, if a user wishes to store the cassette 20 in a limited space, e.g., if one wishes to store as many cassettes as possible within a glove compartment or console box of a motor vehicle, there may be some instances where the cassettes are not placed in cassette accommodating cases 31 prior to storage. When a cassette is stored without using the case 31, the cassette is exposed not only to infiltration of dust, which encourages deterioration of the magnetic tape's recording/reproducing performance, but also to damage due to direct impact from dropping, etc.

To overcome the above problems, the applicant has proposed several thin cassette accommodating cases (see, for instance, Japanese Utility Model Unexamined Publications Nos. 163279/1985 and 52782/1988). In these thin cassette accommodating cases, a cassette is accommodated in the case upside down with respect to its position in a conventional case so that its thick portion is positioned on the opening side of the case, and recesses for receiving the thick portion are formed on both upper and lower walls of the case.

An improved cassette accommodating case as disclosed in Japanese Utility Model Unexamined Publication No. 52782/1988 will be discussed as an example. As shown in FIG. 2, this cassette accommodating case 11 is arranged so that a cover member 12 having a pocket 14 is pivotably attached to a casing member 15 in a manner similar to the conventional cassette accommodating case, and recesses 18 for receiving the thick portion 21 of a cassette are formed respectively on the opening side of wall portions 13, 16 of the cover member 12 and the casing member 15, the wall portions extensively confronting the upper and lower surfaces of the cassette.

The recesses 18 are formed so as to confront each other toward the interior of the case to such a depth and shape as to receive the thick portion 21.

Accordingly, the cassette accommodating case 11 can be formed so that the thickness between the wall portions 13 and 16 is only slightly larger than the thickness $l_2$ excluding the thick portion 21, thus achieving an appreciably thin structure compared to the conventional case. Therefore, the required storage space can be reduced, and the ease of use of the cassette is greatly improved compared to the conventional case.

However, the inventors have found that such an improved case still presents problems to be overcome.

Specifically, with respect to magnetic tape cassettes containing recordings of music such as classical music where the musical work is often long, two or more cassettes must be employed to record the work, and such cassettes are sold as a set. However, a conventional cassette accommodating case can hold only one cassette.

Therefore, a user must use care to keep a set of cassettes together, which is inconvenient. Particularly, for language learning tapes and the like, which must be arranged in accordance with a learning program, it is customary to provide a dedicated box.

No consideration has heretofore been given to providing a thinner case that can accommodate a plurality of cassettes, i.e., two or more cassettes simultaneously, nor has any such technical idea been presented.

SUMMARY OF THE INVENTION

The invention has been made in view of the above circumstances. Accordingly, an object of the invention is to provide a cassette accommodating case which can accommodate a plurality of cassettes but which has a generally thin structure and which can provide excellent storing convenience.

The above and other objects of the invention are achieved by a magnetic tape cassette accommodating case that comprises a cover member having a pocket for receiving end portions of magnetic tape cassettes and a casing member having rotation stopper projections, with the cover member and the casing member being pivotably assembled. In such a magnetic tape cassette accommodating case, the pocket is formed so as to be large enough to receive the side end portions of the magnetic tape cassettes superposed in a reversed relation with respect to one another, i.e., with the lengthwise axes aligned but with the thick portions arranged diagonally with respect to one another, a recess portion for receiving the thick portion of one of the superposed magnetic tape cassettes is formed on a wall surface of the cover member while a recess portion for receiving the thick portion of the other superposed magnetic tape cassette is formed on a wall surface of the casing member, and rotation stopper projections that are inserted into shaft insertion holes of the magnetic tape cassettes are provided, the shaft insertion holes being partially aligned by superposing the magnetic tape cassettes.

In the thus-constructed magnetic tape cassette accommodating case, the side end portions of the magnetic tape cassettes are inserted into the pocket while directly superposed upside down, with their thick portions received by the recesses. Therefore, the case can be designed to be thin even though two cassettes can be placed in the case in a superposed state. When the shaft insertion holes of the superposed magnetic tape cassettes are partially aligned, the rotation stopper projections that are designed so as to be inserted through the thus partially aligned holes prevent the magnetic tapes of the cassettes from slackening in both directions.

The inventive arrangement of the positioning ribs, which allows the shaft insertion holes of the superposed magnetic tape cassettes to be wholly aligned, also contributes to preventing the magnetic tapes from slackening, etc., due to the provision of the rotation stopper projections.

A further object of the invention is to provide a cassette accommodating case which can accommodate a plurality of cassettes with excellent handling convenience, and which is generally thin in structure and which provides handy storage.

The above and other objects of the invention can be achieved by a magnetic tape cassette accommodating case that comprises a cover member having a pocket for receiving end portions of magnetic tape cassettes and a casing member having rotation stopper projections, with the cover member and the casing member pivotably assembled with each other. In such a magnetic tape cassette accommodating case, a first recess for receiving the thick portions of a plurality of magnetic tape cassettes, e.g., two magnetic tape cassettes, is formed on a wall portion of the cover member, and a second recess for receiving the thick portions of the plurality of magnetic tape cassettes is formed on a wall portion of the casing member as well as at a position confronting the first recess when the casing member and the cover member are closed relative to one another.

The above object of the invention can also be achieved by a magnetic tape cassette accommodating case in which at least one of the first recess and the second recess is formed into a long groove on the wall portion of either the cover member or the casing member, the long groove extending in a radial direction when viewed from the direction in which the case is opened and closed.

The above object of the invention can further be achieved by a magnetic tape cassette in which cassette guiding side walls extending in a direction of inserting and extracting the magnetic tape cassettes are provided on both right and left side end portions of the cover member, and still further by a magnetic tape cassette accommodating case in which a stepped portion is provided on an upper wall surface forming the pocket, the stepped portion serving to check incorrect insertion in the course of inserting the magnetic tape cassettes into the pocket.

The above objects of the invention can yet further be achieved by a magnetic tape cassette accommodating case for accommodating a single cassette, which comprises a cover member having a pocket for receiving either the right or left end portion of a magnetic tape cassette and a casing member having rotation stopper projections, the cover member and the casing member being pivotably assembled. In such a magnetic tape cassette accommodating case, the pocket receives either a right or left end portion of the cassette and allows the case to be opened and closed with a shorter side of the case as an axis of rotation, at least one of plural recesses for receiving the thick portion of the cassette formed on the cover member and the casing member is formed into a long groove extending along the length of the case, and a cassette guiding side wall extending along the length of the cover member is formed on at least one end portion of the cover member in addition to side walls of the pocket.

The above objects of the invention can be achieved further by a magnetic tape cassette accommodating case in which a stepped portion is provided on an upper wall surface forming the pocket, the stepped portion being abutted against a side surface of the magnetic tape cassette in the course of inserting the cassette into the pocket, and still further by a magnetic tape cassette accommodating case in which recesses are provided on both side end portions along the length of the case so as to confront each other, wherein either one of the recesses can receive the thick portion independently of the direction of insertion of the magnetic tape cassette into the case.

BRIEF DESCRIPTION OF THE DRAWINGS

FIG. 7 is a perspective view of a cassette accommodating case of a second embodiment Of the invention;

FIG. 8 is a perspective view showing a state of accommodating cassettes;

FIG. 12 is a perspective view of a cassette case constructed according to a fourth embodiment of the invention;

FIG. 13 is a perspective view showing a state of accommodating cassettes;

FIG. 14 is a perspective view of a case of a fifth embodiment of the invention;

FIG. 15 is a perspective view of a case of a sixth embodiment of the device;

FIG. 16 is a perspective view showing a state of accommodating cassettes;

FIG. 17 is a perspective view of a case of a seventh embodiment of the invention;

FIG. 18 is a perspective view of a case of an eighth embodiment of the invention;

FIG. 19 is a perspective view of a case of a ninth embodiment of the invention;

FIG. 20 is a perspective view of a case of a tenth embodiment of the invention;

FIG. 21 is a perspective view of a case of an eleventh embodiment of the invention.

DESCRIPTION OF THE PREFERRED EMBODIMENTS

Figure 1:
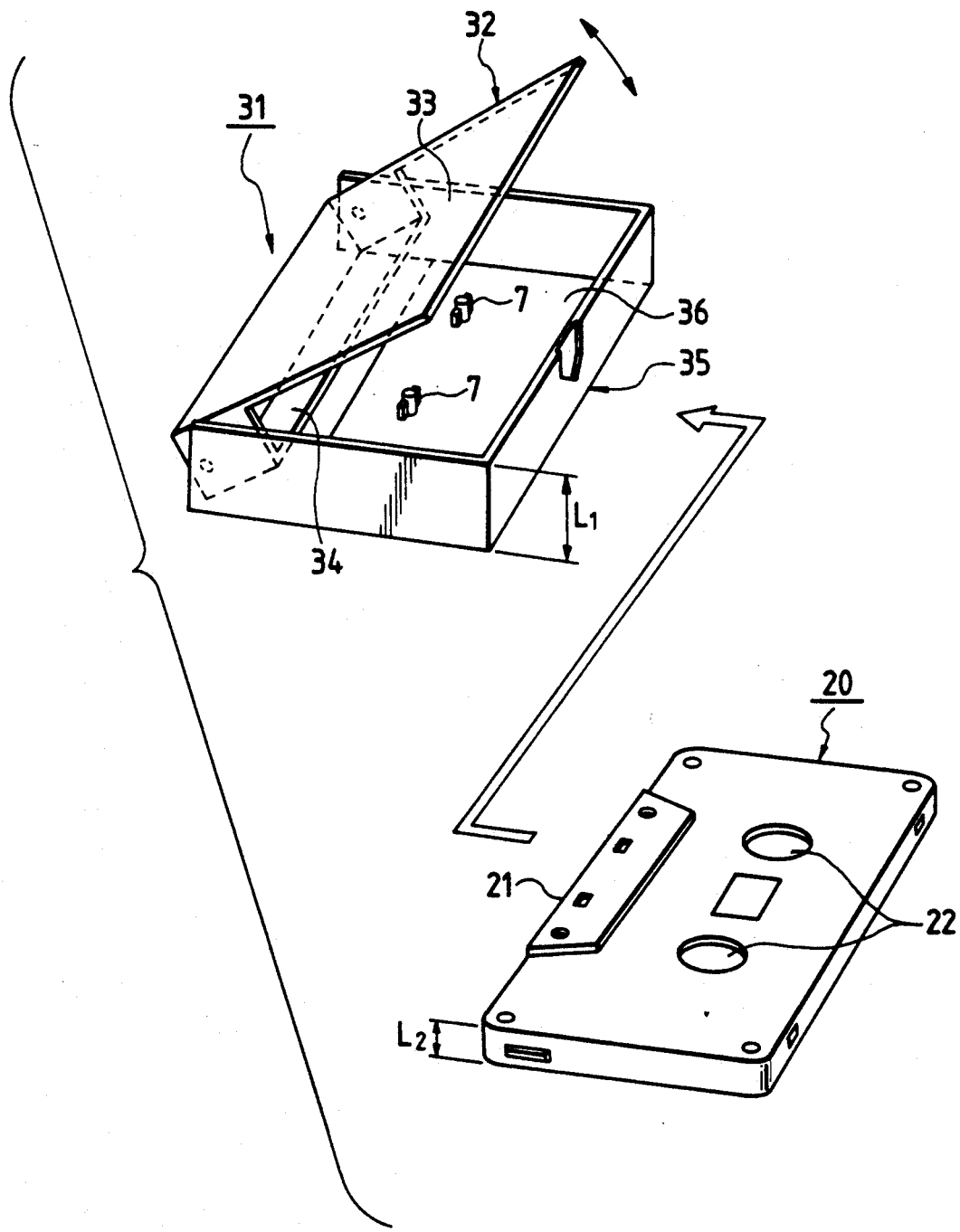
FIG. 1 is a perspective view of a conventional cassette accommodating case.
Figure 2:
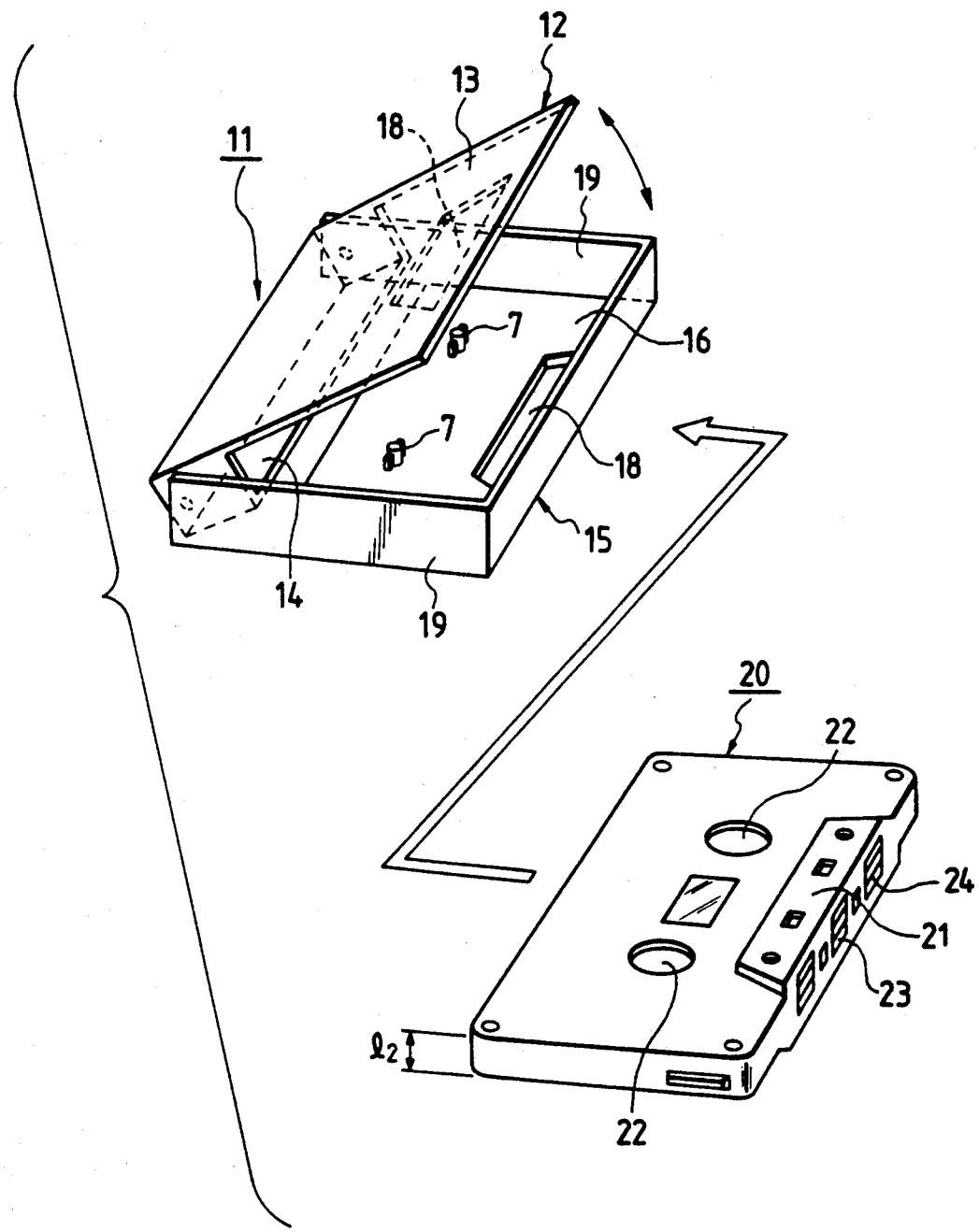
FIG. 2 is a perspective view of a conventional cassette accommodating case.
Figure 4:
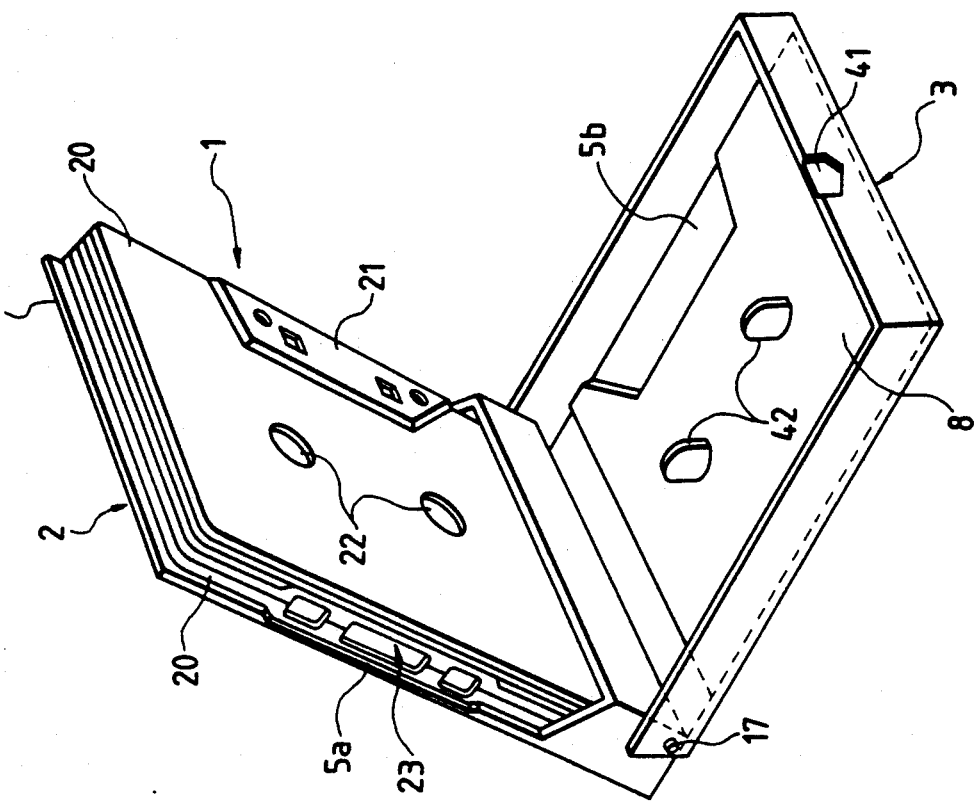
FIG. 4 is a perspective view showing a state of accommodating cassettes.
Figure 3:
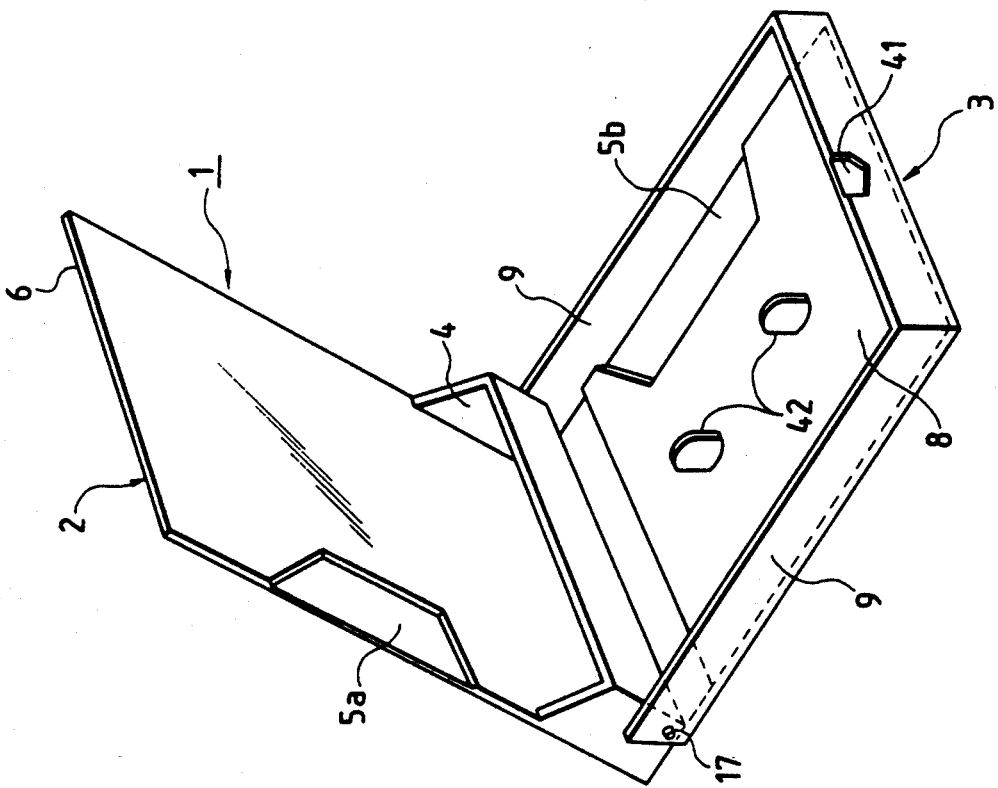
FIG. 3 is a perspective view of a cassette accommodating case of a first embodiment of the invention.
Figure 5:
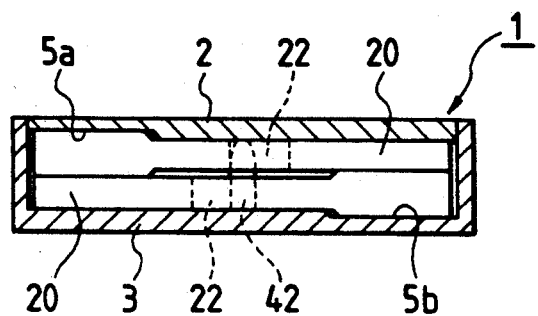
FIG. 5 is a sectional view Of a main portion showing the state of accommodating the cassettes.
Figure 6:
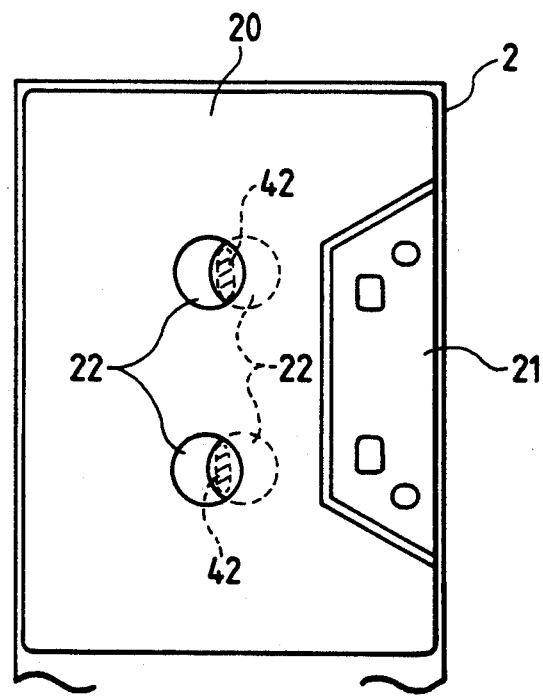
FIG. 6 is a plan view of a main portion showing the state of accommodating the cassettes.

A first embodiment of the invention will now be described with reference to FIGS. 3 to 6. FIG. 3 is a perspective view of a cassette accommodating case, constructed according to the invention, FIG. 4 is a perspective view showing a state of accommodating cassettes, FIG. 5 is a sectional view of a main portion of the cassette accommodating case, and FIG. 6 is a plan view of the main portion.

A feature of this embodiment is that two cassettes are longitudinally accommodated while superposed, and the case is made thin as a whole.

A cassette accommodating case 1 is composed of a cover member 2 having a pocket 4 and a casing member 3 having a pair of rotation stopper projections 42. The pocket 4 serves as a space into which two magnetic tape cassettes 20 can be inserted simultaneously with the rear end portion of one of the cassettes and the front end portion, i.e., the thick portion 21, of the other cassette superposed. The rotation stopper projections 42 are inserted into shaft insertion holes 22 of the superposed cassettes 20 and arranged on a wall portion 8 that forms the casing member 3.

The cassette accommodating case 1 is designed so that the casing member 3 and the cover member 2 can be opened and closed in the manner of a door around an axis extending across the width of the case by causing support projections 17 to be fitted with throughholes, the support projections being internally arranged on lateral walls 9 of the casing member 3 which face the front and rear ends of each cassette and the throughholes being provided on lateral walls of the pocket 4 close to its bottom.

On a wall portion 6 of the cover member 2 is formed a recess 5a that is large enough to accommodate the thick portion 21 of one of the cassettes 20b. At an end portion on the wall portion 8 of the casing member 3 there is formed a recess 5b that is large enough to accommodate the thick portion 21 of the other cassette. The two recesses 5a, 5b are located so that they confront diagonally when the case 1 is closed. Both recesses 5a, 5b are arranged to receive the thick portions upside down when accommodating both cassettes 20a, 20b while superposed. The recess 5a corresponds to the first recess, and the recess 5b corresponds to the second recess.

To place the two cassettes 20 in the cassette accommodating case 1, the rear end of one of the two cassettes and the thick portion 21 of the other cassette are superposed one upon the other, and the superposed cassettes are inserted into the pocket 4 in the longitudinal direction, as shown in FIG. 4. As a result, the thick portion 21 of one of the cassettes is fitted with the recess 5a, while the thick portion 21 of the other cassette is exposed. By rotating the casing member 3, the thick portion 21 of the other cassette is fitted with the recess 5b, completing the accommodation of the two cassettes.

The shaft insertion holes 22 are not formed so as to extend along the centerline of the cassettes 20 in the width direction, but are formed along a line that is slightly offset toward the rear end. For this reason, when the two cassettes 20 are superposed so that their contours completely coincide, their shaft insertion holes 22 are aligned only partially as shown in FIG. 4, thereby not allowing the rotation stopper projections 42 of the conventional shape to be inserted into the shaft insertion holes.

To allow the shaft insertion holes 22 to receive the rotation stopper projections 42, the projections 42 are formed into a thin, tongue-like member as shown in FIGS. 3 and 4. Therefore, even if the two cassettes 20 are superposed so that their contours coincide, the rotation stopper projections 42 can pass through the partially aligned shaft insertion holes 22, as shown in FIGS. 5 and 6, hence allowing the cassettes to be fully received in the case.

The thus-constructed cassette accommodating case 1 is designed so that its external shape and volume can be reduced noticeably compared to the conventional cassette accommodating cases. This feature will be described in more detail below.

A second embodiment of the invention will be described with reference to FIGS. 7 to 10. This embodiment differs from the first embodiment in that the former is provided with ribs in the casing member 3 to position the shaft insertion holes 22. In FIGS. 7 to 10, elements similar to those in the first embodiment are designated by the same reference numerals, and a further description thereof will be omitted.

While the structure of the cover member 2 is the same as that of the first embodiment, its width W is increased in proportion to the dimension of the rib 45. The casing member 3 is provided with ribs 45 at positions confronting the recess 5a when the cover member 2 and the casing member 3 is closed. The ribs serve as positioning members for aligning the shaft insertion holes 22 of the superposed cassettes 20. The pair of rotation stopper projections 42 are not tongue-like, but take substantially the same form as those of the conventional cases.

To place the cassettes 20 in the case, the thick portion 21 of a first cassette 20, i.e., the cassette 20, which is on the lower side shown in FIG. 8, is inserted into the pocket 4 so as to be received by the recess 5a. Under this condition, a gap is provided between the upper surface of the lower cassette 20 and the internal surface of the frame wall 43 forming the pocket 4 to admit the side end portion of the other cassette 20. To accommodate the upper cassette 20, its side end portion is inserted into this gap.

Therefore, when the two cassettes 20 have been inserted while stacked, the thick portion 21 of the upper cassette 20 protrudes from the rear end of the lower cassette 20, as shown in FIG. 8. However, since the side end portion of the upper cassette 20 is positioned by the pocket 4, there is no danger that the upper cassette 20 will protrude so as to interfere with the closure of the case. The upper cassette 20 protrudes only so much that the casing member 3 can be closed.

As a result, the two cassettes 20 are accommodated while stacked in a single cassette accommodating case 1. By closing the cover member 2, the rotation stopper projections 42 are inserted into respective ones of the shaft insertion holes 22.

Figure 9:
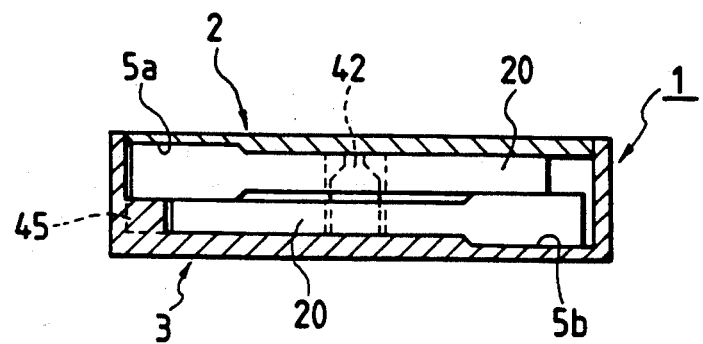
FIG. 9 is a sectional view of a main portion showing the state of accommodating the cassettes.
Figure 10:
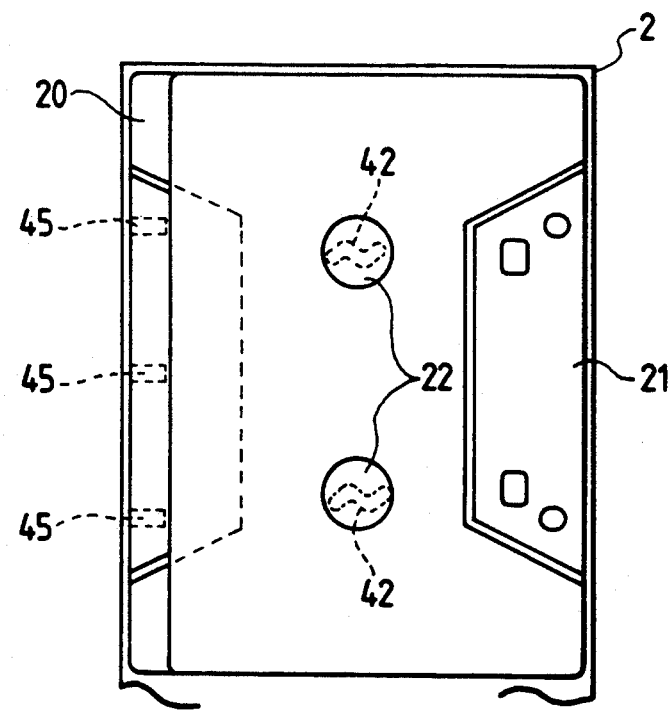
FIG. 10 is a plan view of a main portion showing the state of accommodating the cassettes.

FIGS. 9 and 10 are sectional views showing a main portion of a state of accommodating cassettes. FIG. 9 shows that the insertion holes 22 of the respective cassettes 20 are aligned, and FIG. 8 shows that the rotation stopper projections 42 are inserted into the insertion holes 22 simultaneously.

An exemplary size of the cassette accommodating case 1 will be described. The width W is larger by the size of the rib (by 5.8 mm) than that of the conventional cases. However, the thickness $L_2$ can be decreased by about 6 mm compared to the combined thickness of two conventional cases owing to the arrangement of the recesses 5a, 5b. The volume of the cassette accommodating case 1, although holding two cassettes, can be limited to about 1.53 times the volume of a conventional case storing a single cassette.

That is, the case of the invention can accommodate two cassettes 20 while only increasing the volume by about 53% compared to the volume of a case containing a single cassette.

As a result, the convenience of use is enhanced by allowing two cassettes 20 related to each other in recorded content to be stored together. In removing the cassettes 20 after opening the cassette accommodating case 1, the fact that the two cassettes are stepped in outside configuration facilitates the operation, even if only one cassette is to be extracted.

While the reduction in thickness and volume of the cassette accommodating case 1 of the second embodiment shown in FIG. 7 has been described above, the cassette accommodating case 1 of the first embodiment shown in FIG. 3 is smaller than the second embodiment by a size equal to the rib 45.

A third embodiment of the invention will be described with reference to FIG. 11. The third embodiment differs from the second embodiment in that the former has the ribs 45 within the pocket 4.

More specifically, the ribs 45 are arranged on a corner within the side plate 43 and at which the recess 5a is formed. According to this structure, the positioning of the two cassettes 20 is completed prior to closing the cover member 2 and the casing member 3, i.e., in the state shown in FIG. 8. Therefore, as described in connection with the second embodiment, the shaft insertion holes 22 of the two cassettes are aligned, thereby making the rotation stopper projections 42 of the conventional structure ready to pass therethrough.

The reduction in size of the entire case 1 can be achieved in the same way as the previously described embodiments.

According to the above embodiments, the side end portions of the cassettes 20 are positioned close to a recess 41 on which the user places a finger to open the cassette accommodating case 1. Therefore, when opening the case 1, one does not have to touch the magnetic tape (not shown) exposed at the front opening end 23. This prevents the tape from being contaminated by the user's fingers, and facilitates the operation of storing cassettes.

While preferred embodiments of the invention have been described above, the invention is not limited thereto, but may be modified in various ways.

Figure 11:
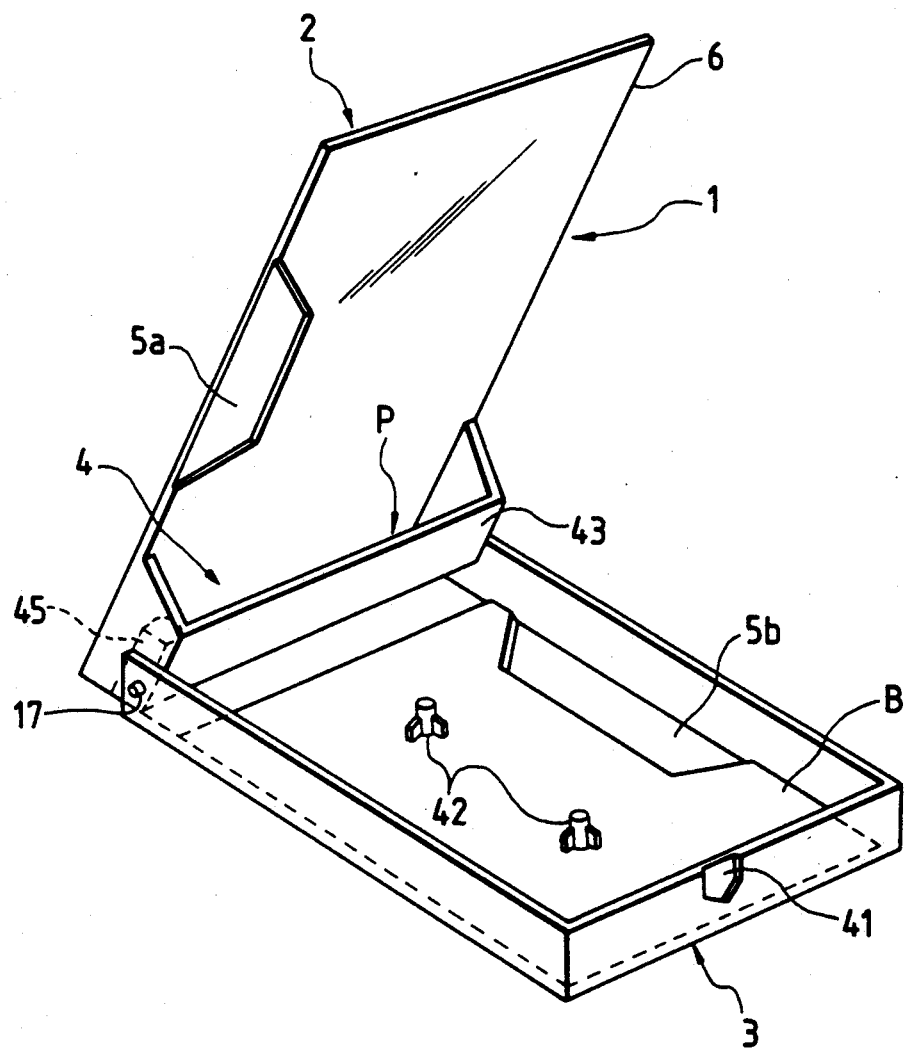
FIG. 11 is a perspective view of a cassette accommodating case of a third embodiment.

For example, the ribs 45 may be formed at the positions P shown in FIGS. 7 and 11. Accordingly to this modified arrangement, the two cassettes 20 can be inserted simultaneously.

As described above, the cassette accommodating case of the invention has the features that recesses for receiving the thick portions of the superposed cassettes are formed both on the wall portion of the cover member and on the casing member, the cover member has a pocket into which the side end portions of the cassettes superposed upside down are inserted, and rotation stopper projections which are to be inserted into the partially aligned shaft insertion holes of the superposed cassettes or the positioning ribs for aligning the shaft insertion holes are provided.

With this arrangement, a plurality of cassettes can be stacked, i.e., superposed, within a single cassette accommodating case, allowing long recorded musical selections or the like to be stored as a group, thereby improving the ease of use compared to the situation where cassettes relating to each other are stored individually.

Further, the arrangement of the recesses for receiving the thick portions of a plurality of cassettes allows the thickness of the cassette accommodating case to be reduced as a whole, thereby contributing to reducing the storage volume.

Still further, the rotation stopper projections can be inserted into the shaft insertion holes irrespective of how the cassettes are superposed, thereby preventing the slackening of the magnetic tapes, etc.

A fourth embodiment of the invention will now be described with reference to FIGS. 12 and 13. FIG. 12 is a perspective view of a case, and FIG. 13 is a perspective view showing a state of accommodating cassettes.

A case 101 is composed of a cover member 102 having a pocket 104 and a casing member 103 having two pairs of rotation stopper projections 142. The pocket 104 is formed with a space into which both right and left end portions of two cassettes 120 can be inserted simultaneously. The rotation stopper projections 142 are inserted into shaft insertion holes 122 of the cassettes 120. The case 101 is designed so that the casing member 103 and the cover member 102 can be opened and closed in the manner of a door with a longer side as an axis of rotation by causing support projections to be fitted with throughholes, the support projections being internally arranged on side walls 109 of the casing member 103, the lateral walls facing the front and rear ends of the respective cassettes, and the throughholes being provided on lateral walls of the pocket 104 close to its bottom. Substantially in the middle of wall portions 106, 108 extensively confronting the upper and lower surfaces of the cassettes in the cover member 102 and the casing member 103 are formed recesses 105a, 105b. Each of the recesses 105a, 105b is large enough to receive two thick portions 121. The recess 105a corresponds to a first recess and the recess 105b corresponds to a second recess.

Each of the recesses 105a, 105b is formed at a position at which the thick portions 121 abut each other when the two cassettes 120 are inserted into the pocket 104 with their front opening ends facing each other. The shape of each recess is trapezoidal so that the thick portions 121 can be received.

On the front end 110 of the open casing member 103 is formed a recess 141, which constitutes a finger rest to make it easier for the user to open the cover member 102.

To place the cassettes 120 in the case 101, the right and left end portions of the two cassettes 120 are placed in the pocket 104 in such a manner that the thick portions 121 of the two cassettes 120 confront each other. As a result, the thick portions 121 of the respective cassettes 120 are received by the recess 105a simultaneously. By closing the cover member 102 under this condition, the thick portions 121 are fitted into the recesses 105a, 105b, thereby allowing the case 102 to be closed.

Under this condition, the two thick portions 121 are positioned while fitted with the recesses 105a, 105b, so that the case 101 can be made thinner as a whole in proportion to the depth of the recesses 105a, 105b.

The relative volume between the case 101 of the device and a conventional case will be compared.

The volume of a conventional case accommodating a single cassette is about 126.14 cm$^3$, and a conventional case accommodating two cassettes has a volume of about 239.67 cm$^3$, thereby making the latter volume 190% with the former volume being 100%. In contrast thereto, the volume of a thin case accommodating a single cassette is about 103.88 cm$^3$, which is 82.4% of the reference volume. The volume of a thin case 101 accommodating two cassettes of the device is about 197.37 cm$^3$, which is 156% or so of the reference volume. That is, the case 101 of the invention can contain two cassettes with a volume about 1.5 times the conventional case containing only one cassette, thereby providing convenience in storing cassettes.

A fifth embodiment of the invention will be described with reference to FIG. 14. The fifth embodiment differs from the fourth embodiment in that the recess 105a extends toward the opening end portion of the wall portion 106. In FIG. 14, members similar to those in the fourth embodiment are designated by the same reference numerals, and a further description thereof will be omitted.

The recess 105a extends close to the opening end portion of the wall portion 106 of the cover member 102, that is, the recess is longitudinally extended compared to the recess of the fourth embodiment. The recess 105a is designed so as to improve the ease of use of the cassette case when two cassettes are put in and taken out of the case.

More specifically, to put the cassettes 120 in the case, the thick portions 121 of the cassettes 120 are fitted with the recess 105a before the right and left end portions of the cassettes 120 are located in front of the pocket 104. Therefore, the cassettes 120 can be easily slipped into the pocket 104. On the other hand, the recess 105b, having the same shape as that of the first embodiment, serves to eliminate play of the cassettes 120 once the cassettes have fully been accommodated in the case.

To take the two cassettes out of the case, it is only required to open the casing member 103 and to incline the cover member 102 toward its opening end portion, so that the two cassettes 120 are ready to be slipped out. However, the thick portions 121 are caught by the end portion of the recess 105a, thereby preventing the cassettes 120 from falling out.

The recess 105a may extend to reach the opening end of the wall portion 106, as shown by the dotted line. In such a case, although the cassettes may be susceptible to slipping out, the cassettes 120 can be put in and taken out of the case easily.

A sixth embodiment of the invention will be described with reference to FIGS. 15 and 16. The sixth embodiment differs from the fourth embodiment in that the thick portions 121 of the two cassettes 120 can be received while apart from each other. In FIGS. 15 and 16, members similar to those of the fourth embodiment are designated by the same reference numerals, and a further description thereof will be omitted.

On the wall portion 106 of the cover member 102 are formed two recesses 151a, while on the wall portion 8 of the casing member 103 two recesses 151b are formed. The two recesses 151a are positioned apart from each other in the vicinity of both side ends of the wall portion 106. In other words, the two recesses 151a are formed at positions so that the thick portions 121 can be apart from each other when the end portions of the cassettes 120 are inserted into the pocket 104.

The recesses 151b are formed at positions confronting the recesses 151a when the casing member 103 is closed. The stopper projections 42 are formed further toward the center from each recess 151b so as to be inserted into the shaft insertion holes 122 when the casing member 103 is closed with the cassettes 120 put into and positioned in the pocket 104.

Thus, as the end portions of the cassettes 120 have been inserted into the pocket 104, their thick portions 121 are positioned at the right and left sides of the wall portion 106, as shown in FIG. 16. When the casing member 103 is closed, the thick portions 121 are interposed between respective ones of the pairs of recesses 151a, 151b, thereby causing the cassettes 120 to be similarly positioned. This embodiment can also achieve a reduction in volume while holding two cassettes 120 in one case, thus making storage very convenient.

Accordingly, the arrangement of the first and second recesses for receiving the thick portions on the wall portions confronting each other hen the cover member and the casing member are closed allows two cassettes to be accommodated inside a single case while horizontally juxtaposed. In addition, since the thick portions are received by the first and second recesses, the case can be made thin.

The recesses 151a, 151b may also be formed so as to reach the opening ends of the wall portion 106, as shown by the dotted line in FIG. 15. These recesses may also be formed so that the two cassettes 120 are, e.g., juxtaposed in the same direction, i.e., one of the pairs of recesses is provided toward the center of the wall portions 106, 108, and the other pair of recesses is provided at one side of the wall portions 106, 108.

While several embodiments of the invention have been described above, the invention is not limited thereto, but may be embodied as shown, e.g., in FIGS. 17 to 20.

A seventh embodiment shown in FIG. 17 has the feature that at least one of the first and second recesses, e.g., the recesses 151a, is formed into a long groove extending to reach the pocket from the opening end of the wall portion 106 of the cover member 102.

On an upper wall surface 160 forming the pocket 104 is formed a stepped portion 161, which abuts against side surfaces (an end surface 125 of the thick portion or the right or left end surface 126 shown in FIG. 16) of the cassette 120 when the cassettes 120 are inserted into the pocket, thus preventing the cassettes from being inserted in the incorrect direction.

More specifically, in the course of inserting the cassettes into the pocket, if a cassette 120 is about to be inserted in the wrong direction, e.g., even if one end of the cassette 120 has successfully been received in the pocket a very short distance, the abutment of the end portion 125 of the thick portion against the stepped portion 161 immediately warns the user of incorrect insertion.

Assuming that the gap between the upper wall surface 160 and the wall portion 106 is H, the thickness of the end surface 125 of the thick portion is $t_1$, the thickness of the right or left end surface 126 of the cassette is $t_0$, and that $(t_1 + t_0)$ is T (see FIG. 16), if the gap h is made smaller than T and very close to the thickness $t_0$ of the right or left end surface 126, the insertion of even one end portion of the cassette into the pocket can be checked as described before. Therefore, no cassette 120 is admitted at all unless inserted in the right direction.

The structure of an eighth embodiment shown in FIG. 18 is featured by a stepped portion 162 for preventing incorrect insertion in a manner similar to the embodiment shown in FIG. 17. The stepped portion 162 is not formed by extending the upper wall surface 160 as the stepped portion 161, but is made thicker than the other portion of the upper wall surface 160. That is, the effect of this stepped portion 162, which has a gap h smaller than the dimension T and very close to the thickness $t_0$ of the right or left end surface 126 of the cassette 120, will prevent even one end of the cassette 120 from entering the pocket. Therefore, no cassette 120 is admitted at all unless inserted in the right direction.

Each of the recesses 151a (only one is shown in FIG. 18) that have a long groove structure is provided with a slope 153 that makes the recess shallow as it extends toward the depth of the pocket. The slope 153 serves to appropriately bias the edge of the cassette 120 inserted into the pocket, thus confining play of the cassette within the pocket.

The structure of a ninth embodiment shown in FIG. 19 is featured by side walls 163 arranged on the right and left ends of the wall portion 106 of the cover member 102, the side walls 163 extending in the direction of inserting the cassettes and serving as guides. The side walls 163 have the function of guiding and helping the operation of, e.g., sliding the cassette 120 when putting the cassette 120 in or taking it out of the case. On the side walls 109 of the casing member are formed receiving portions 109a for receiving the side walls 163. The receiving portions 109a are designed so as to be fitted with the side walls 163 so as to be integrated therewith when the case is closed. As a result of this structure, even if the thickness of the side walls 163 or the side walls 109 of the casing member is reduced, the walls are properly engaged with each other to maintain an acceptable rigidity.

The side walls 163 may not have to be extended to reach the edge of the wall portion 106, but may be about half or less of what is shown in FIG. 19. In addition, the side walls 163 need not necessarily be in content with the side walls of the pocket 104, but may be of such structure that a plurality of wall pieces of an appropriate shape are provided. In this case, an index card that is folded along the guide wall may also be used.

Figure 22:
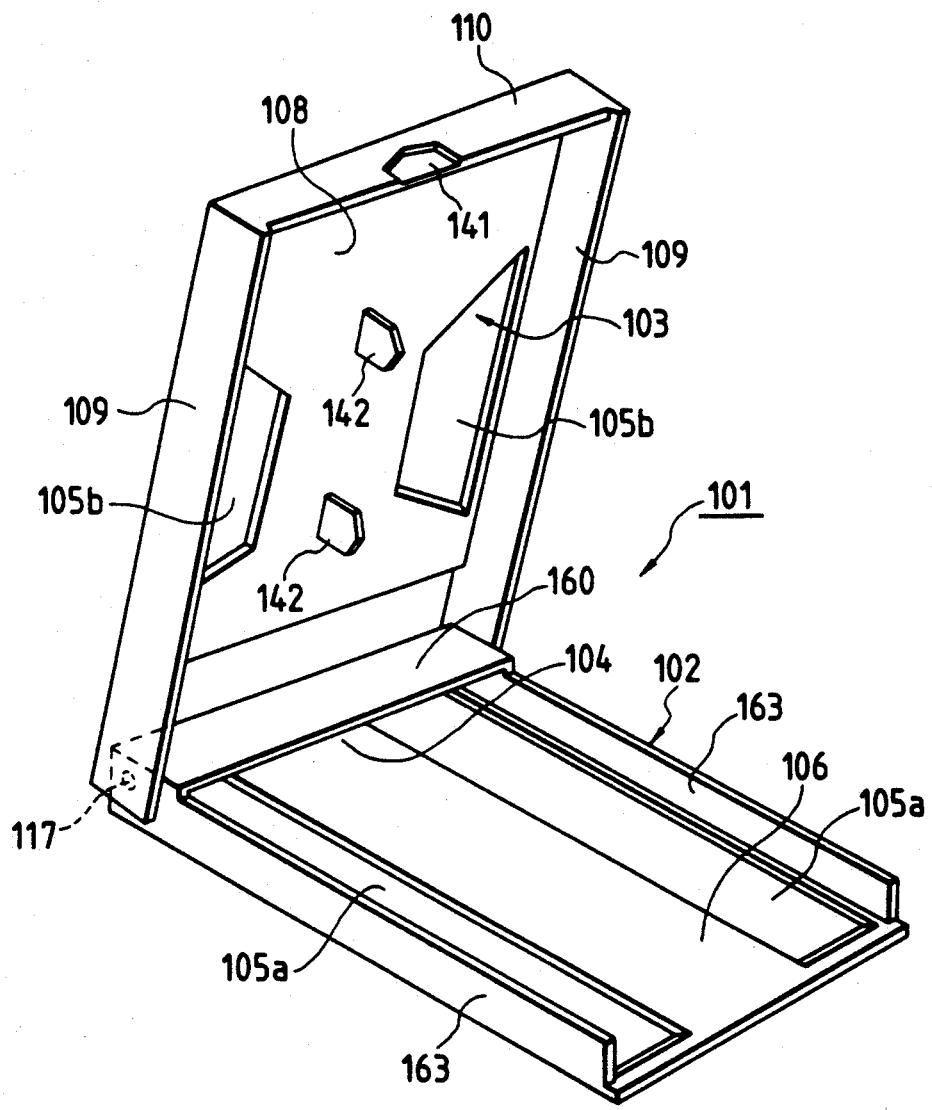
FIG. 22 is a perspective view of a case of a twelfth embodiment of the invention.

The structures of tenth to twelfth embodiments of the invention shown in FIGS. 20 to 22 relate to a case 101 accommodating only one magnetic tape cassette, not a plurality of cassettes as the above embodiments. The structure shown in FIG. 20 is featured by a pocket 104 that accommodates one end portion, right or left, of a cassette, with the pivotably assembled portion arranged along the shorter side of the case, so that the case can be opened and closed along the length of the case. Of the recesses 105a, 105b of the cover member 102 and the casing member 103, the recess 105a of the cover member 102 is formed into a long groove extending along the length of the case. On both end portions of the cover member 102 are formed upright side walls 163 that serve as guides when the cassette is put into and taken out of the case.

In the tenth embodiment, the side wall 163 on the side of the recess 105a extends substantially all the way along the length of the cover member, while the other side wall extends halfway along the length of the cover member with its end portion being tapered. On one of the side walls 109 of the casing member 103 is formed a stepped receiving portion 109a for receiving the tapered side wall 163.

On the upper wall surface 160 forming the pocket 104 is a stepped portion 161 that abuts against the side surface of the cassette 120 (either the end surface 125 of the thick portion or the right or left end surface 126 shown in FIG. 16), in a manner similar to the embodiment shown in FIG. 17, in the course of inserting the cassettes 120 into the pocket.

With this structure, in the course of inserting the cassettes into the pocket, if a cassette 120 is about to be inserted in the wrong direction, e.g., even if one end of the cassette 120 has successfully been received by the pocket a very short distance, the abutment of the end portion 125 of the thick portion against the stepped portion 161 immediately warns the user of incorrect insertion. The distance h between the upper wall surface 160 and the wall portion 106 can be set to a value similar to that in the embodiment shown in FIG. 17. Thus, depending on the dimension H, no right or left end portion of a cassette 120 is admitted at all unless inserted in the right direction.

The structure shown in FIG. 21 is featured similarly by a stepped portion 162 for preventing wrong insertion as in the embodiment shown in FIG. 20. However, the stepped portion 162 is made thicker than the other portion of the upper wall surface 160, not so as to expand part of the upper wall surface 160 as the stepped portion 161 shown in FIG. 17. The distance h between the pocket wall surfaces can be set to the same value as in the embodiment shown in FIG. 18. Thus, incorrect insertion of the cassette 120 can be completely prevented.

A long groove-like recess 105a is provided with a slope 153 that makes the recess shallower as it extends toward the depth of the pocket. The slope 153 serves to appropriately bias the edge of the cassette 120 inserted into the pocket, thus confining play of the cassette within the pocket.

The structure shown in FIG. 22 is featured by a total of four recesses 105a, 105b that confront each other on both ends of and along the length of the case. On both end portions of the cover member 102 are formed side walls 163 extending all the way along the length of the case. The arrangement of the recesses formed on both sides makes it possible for the case to receive the cassette 120 in any insertion direction. The side wall 163 may be arranged only in a single side if desired.

The rotation stopper projections 142 in this embodiment are positioned so that they can hold the hubs as they are inserted into the hub holes 122 with the cassette 120 being inserted in any insertion direction, and has a thin structure. The rotation stopper projections 142 may be made of a material different from the material of the case body. For example, elastic members may be bonded or two-color molded members may also be used. Particularly, rotation stopper projections 142 made of elastic members are suitable for this embodiment because the rotation stopper projections 142 are to be only abutted against the hubs.

The embodiments of the invention are not limited to the above, but may, of course, include appropriate combinations of the above. While not shown in the above embodiments, a plurality of grooves or a combination of recesses and projections extending in such a direction as to prevent the user's fingers from slipping may be formed on, e.g., the hand resting portion of the external surface of the case to improve the convenience of opening and closing the case.

As described in the foregoing, the cassette accommodating case of the invention is featured by forming the recesses for receiving the thick portions of a plurality of cassettes both on the wall portion of the cover member having a pocket and on the wall portion of the casing member having rotation stopper projections, the pocket serving to receive the end portions of the plurality of cassettes.

Therefore, a single cassette accommodating case can contain a plurality of cassettes while juxtaposed horizontally. This allows a set of cassettes containing long recorded data, for instance, long musical works, to be stored as a group, thus improving the ease of use of the case. In addition, the arrangement of a plurality of recesses for receiving the thick portions provides the advantage that the total thickness of the case can be reduced, thus contributing to reducing the storage volume as well. The invention is also featured by excellent slidability between the cassette and the case when inserting the cassette into and extracting the cassette from the case. The improved slidability is obtained by the formation of at least one of first and second recesses into a long groove on the wall portion of either the cover member or the casing member, the long groove extending in a radial direction when viewed from the direction in which the case is opened and closed. Further, the arrangement of the side walls extending in the insertion direction on both right and left end portions helps the cassette to be guided in the correct direction. Still further, the provision of the stepped portion on the upper wall surface forming the pocket contributes to preventing incorrect insertion by causing the cassette to be abutted against the stepped portion in the course of inserting the cassette into the pocket unless the insertion direction is correct, thereby improving the cassette handling convenience.

Still further, the arrangement of additional recesses so as to accommodate insertion of the cassette in any direction also contributes to improving the cassette handling convenience.

What is claimed is:

1. The magnetic tape cassette accommodating case for accommodating a single magnetic tape cassette comprising: a cover member having a pocket for receiving either a right or left end portion of said magnetic tape cassette, and a casing member having rotation stopper projections formed thereon, said cover member and said casing member being pivotably interconnected with one another, wherein said pocket receives either the right or left end portion of said cassette and allows said case to be opened and closed with a shorter side of said case as an axis of rotation, a pair of recesses for receiving a thick portion of said cassette being formed on said cover member and said casing member, with one of said recesses being formed as a long groove extending along the length of said case, and a cassette guiding side wall extending along the length of said cover member being formed on at least one end portion of said cover member and side walls of said pocket.

2. The magnetic tape cassette accommodating case according to claim 1, wherein a stepped portion is provided on an upper wall surface forming said pocket, said stepped portion being abutted against a side surface of said magnetic tape cassette in the course of inserting said cassette into said pocket.

3. The magnetic tape cassette accommodating case according to claim 1, wherein said recesses are provided on both side portions along the length of said case so as to confront each other, so that either one of said recesses can receive said thick portion independently of a direction of insertion of said magnetic tape cassette.

* * * * *